United States Patent
Palmieri

(10) Patent No.: US 9,366,457 B2
(45) Date of Patent: Jun. 14, 2016

(54) VACUUM SOLAR THERMAL PANEL PROVIDED WITH AN INTERNAL PRESSURE INDICATOR

(75) Inventor: Vittorio Palmieri, Geneva (CH)

(73) Assignee: TVP SOLAR SA, Geneva (CH)

( * ) Notice: Subject to any disclaimer, the term of this patent is extended or adjusted under 35 U.S.C. 154(b) by 280 days.

(21) Appl. No.: 14/122,464

(22) PCT Filed: May 18, 2012

(86) PCT No.: PCT/EP2012/002126
§ 371 (c)(1),
(2), (4) Date: Nov. 26, 2013

(87) PCT Pub. No.: WO2012/163483
PCT Pub. Date: Dec. 6, 2012

(65) Prior Publication Data
US 2014/0109894 A1 Apr. 24, 2014

(30) Foreign Application Priority Data

May 31, 2011 (EP) ..................................... 11168174

(51) Int. Cl.
*F24J 2/05* (2006.01)
*F24J 2/46* (2006.01)
*F24J 2/50* (2006.01)
*B21D 53/02* (2006.01)

(52) U.S. Cl.
CPC . *F24J 2/05* (2013.01); *B21D 53/02* (2013.01); *F24J 2/4607* (2013.01); *F24J 2/4616* (2013.01); *F24J 2/4629* (2013.01); *F24J 2/507* (2013.01); *Y02E 10/40* (2013.01); *Y10T 29/49355* (2015.01)

(58) Field of Classification Search
CPC ......... F24J 2/4616; F24J 2/4629; F24J 2/507; F24J 2/05; F24J 2/4607; B21D 53/02; Y10T 29/49355; Y02E 10/40
See application file for complete search history.

(56) References Cited

U.S. PATENT DOCUMENTS

| 4,134,390 A * | 1/1979 | Rawal | F24D 11/0221 126/584 |
| 2004/0261789 A1* | 12/2004 | Nakauchi | F24J 2/26 126/658 |
| 2010/0006090 A1* | 1/2010 | Palmieri | C03C 27/02 126/704 |

FOREIGN PATENT DOCUMENTS

| EP | 0053852 A1 | 6/1982 |
| WO | 2009/149753 A1 | 12/2009 |
| WO | 2010/003653 A2 | 1/2010 |

* cited by examiner

Primary Examiner — Alfred Basichas
(74) Attorney, Agent, or Firm — Fox Rothschild LLP

(57) ABSTRACT

The present application relates to a vacuum solar thermal panel (1) of the type comprising: a vacuum-tight envelope (10), having at least a front plate (11) transparent to solar radiation and a support structure (12) for said front plate (11); heat-absorbing means enclosed within said vacuum-tight envelope (10); and main getter means for keeping a vacuum condition within the vacuum envelope (10); wherein the vacuum solar thermal panel (1) further comprises a pressure indicator spot (13) of reactive material deposited on an inner side of said front plate (11), said reactive material undergoing a reaction noticeable from the outside of the vacuum-tight envelope (11) when the pressure within said envelope exceeds a given threshold.

12 Claims, 2 Drawing Sheets

VACUUM SOLAR THERMAL PANEL PROVIDED WITH AN INTERNAL PRESSURE INDICATOR

CROSS-REFERENCE TO RELATED APPLICATIONS

This application is a §371 national stage entry of International Application No. PCT/EP2012/002126, filed May 18, 2012, which claims priority to EP Application No. 11168174.8, filed May 31, 2011, which are hereby incorporated herein by reference in their entireties.

FIELD OF APPLICATION

The present invention relates to a vacuum solar thermal panel provided with an internal pressure indicator and to a related method for manufacturing said vacuum solar thermal panel.

PRIOR ART

As it is well known, vacuum solar thermal panels comprise a vacuum-tight envelope wherein at least a front plate is transparent to solar radiation. The panel comprises heat absorbers disposed within the vacuum envelope and a pipe conveying a heat transfer fluid.

The solar radiation thus enters the vacuum envelope through the front plate, is collected by the heat absorbers and converted into heat. The converted heat is then transferred to the heat transfer fluid flowing into the pipe.

A vacuum solar thermal panel of the known type is described for instance in the PCT application published under No. WO 2010/003653 in the name of the same Applicant.

The vacuum within the envelope, which is a peculiarity of the present kind of solar thermal panels, greatly reduces convection heat losses resulting in higher efficiency of the devices. In state-of-the-art high vacuum panels the internal pressure should be kept below $10^{-3}$ Torr in order for convection losses to be negligible.

In order to maintain said high vacuum condition over time, a getter material, which is able to capture the residual gas molecules by means of chemical reactions and or adsorption, is enclosed within the vacuum envelope. Such an arrangement is usually known as a getter pump.

However, the saturation of the getter pump and/or damaging of the vacuum-tight sealing of the vacuum envelope may lead to a gradual rise in the internal pressure of the panel, causing an abrupt degradation in its efficiency when such pressure exceeds $10^{-2}$ Torr.

In such cases, it is vital to detect the critical condition as soon as possible, in order to replace the damaged vacuum panel and to restore the original efficiency of the thermal plant. However, a visual inspection of the panels may be insufficient to assess a partial loss of the original high vacuum conditions. Indeed, changes to the deformation of the vacuum envelope due to atmospheric pressure are very hard to detect, since they are in general linear with pressure difference and therefore noticeable only when internal pressure exceeds 10 Torr, a value three orders of magnitude higher than that value where the efficiency of the panel drops to unacceptable levels.

A known solution to detect and verify the internal pressure of a vacuum solar thermal panel is attaching a high vacuum gauge to the panel itself; however, it is commercially unacceptable to attach a gauge to every single panel making up a thermal power plant due to the high cost of such gauges.

The technical problem underlying the present invention is therefore that of providing a vacuum solar thermal panel with an internal pressure indicator which is both accurate and cost-effective.

SUMMARY OF THE INVENTION

A solution to the above-mentioned technical problem is provided by a vacuum solar thermal panel, of the type comprising: a vacuum-tight envelope, having at least a front plate transparent to solar radiation and a support structure for said front plate; heat-absorbing means enclosed within said vacuum-tight envelope; and main getter means for keeping high vacuum within the vacuum envelope, wherein the vacuum solar thermal panel further comprises a pressure indicator spot of reactive material deposited on an inner side of said front plate. When the pressure within said envelope exceeds a threshold, the reactive material undergoes a reaction noticeable from the outside of the vacuum-tight envelope.

The idea underlying the present invention is that of employing the spot of reacting material in order to visually detect a loss of the high vacuum conditions within the vacuum-tight envelope.

Advantageously, such a reactive material may be elemental barium.

As barium quickly reacts with the gas molecules entering the vacuum envelope, with the pressure increase the barium spot will reduce in size, eventually turning from a silvery colour to a white one, thus indicating that the panel has to be replaced.

It should be noted that, even if barium is sometimes employed as getter in vacuum systems, such element is employed in the present invention with a different purpose, namely detecting any increase in internal pressure above a pre-defined threshold. Indeed, as mentioned above, the vacuum solar thermal panel according to the present invention already has main getter means other than the pressure indicator spot.

Since the spot does not perform the function of a getter pump, its size may be appropriately limited; this is extremely important because a large deposit of reactive material on the front plate would significantly reduce its transparency, thus leading to degradation of the panel efficiency.

For the same reason, it is preferable to employ main getter means which are not of the flash getter type. For instance, the main getter means may advantageously comprise a non-evaporable getter of the known type.

As mentioned above, the pressure indicator spot should be kept as small as possible, possibly not exceeding 10 cm$^2$, so as not to block solar radiation.

For the same reason its area should preferably be at most 1% of the total transparent area of the front plate.

Moreover, the amount of reacting material and size of the pressure indicator spot identify the pressure threshold determining the change in the spot appearance. The area of the pressure indicator spot should be advantageously kept between 1 cm$^2$ and 3 cm$^2$, while the total amount of reactive material should be advantageously kept between 1 and 5 mg. A spot of barium with such characteristics will change size and/or colour when the internal pressure reaches a critical value of approximately $10^{-2}$ Torr.

The vacuum solar thermal panel according to the present invention may advantageously comprise a reactive material reservoir, solidly attached to the support structure next to the inner side of the front plate. Said reservoir is used in the manufacturing step, being predisposed to contain the reactive material before sublimating it.

The reservoir, which is preferably ring-shaped, may be placed at a distance between 1 and 3 mm from the inner side of the front plate.

The above mentioned reservoir could be a commercially available flash getter with a predefined content of reactive material The support structure may comprise a back plate and a plurality of uprights connecting said back plate to said front plate, and the above-mentioned reservoir may be solidly attached to one of said uprights.

Preferably, the front plate of the vacuum solar thermal panel is substantially flat.

The above-mentioned technical problem is also solved by a method for manufacturing a vacuum solar thermal panel comprising the steps of:

providing a vacuum-tight envelope, having at least a front plate transparent to solar radiation and a support structure for said front plate;

providing heat-absorbing means enclosed within said vacuum-tight envelope;

providing main getter means for keeping a vacuum condition within the vacuum envelope;

depositing reactive material on an inner side of said front plate in order to form a pressure indicator spot undergoing a reaction noticeable from the outside of the vacuum-tight envelope when the pressure within said envelope exceeds a threshold.

Advantageously, the step of depositing reactive material on the inner side of said front plate further comprises the steps of:

attaching a reservoir containing said reactive material to the support structure next to the inner side of the front plate;

heating said reactive material by induction in such a way that said material evaporates and deposits on the inner side of the front plate forming said pressure indicator spot (flashing step).

When elemental barium is employed, the amount of material placed in the reservoir before flashing is preferably comprised between 1 mg and 5 mg.

Further characteristics and advantages shall be clearer from the detailed description, outlined hereinafter, of a preferred but not exclusive embodiment of the present finding, with reference to the attached figures provided for exemplifying and non-limiting purposes.

DETAILED DESCRIPTION

Figure 1:
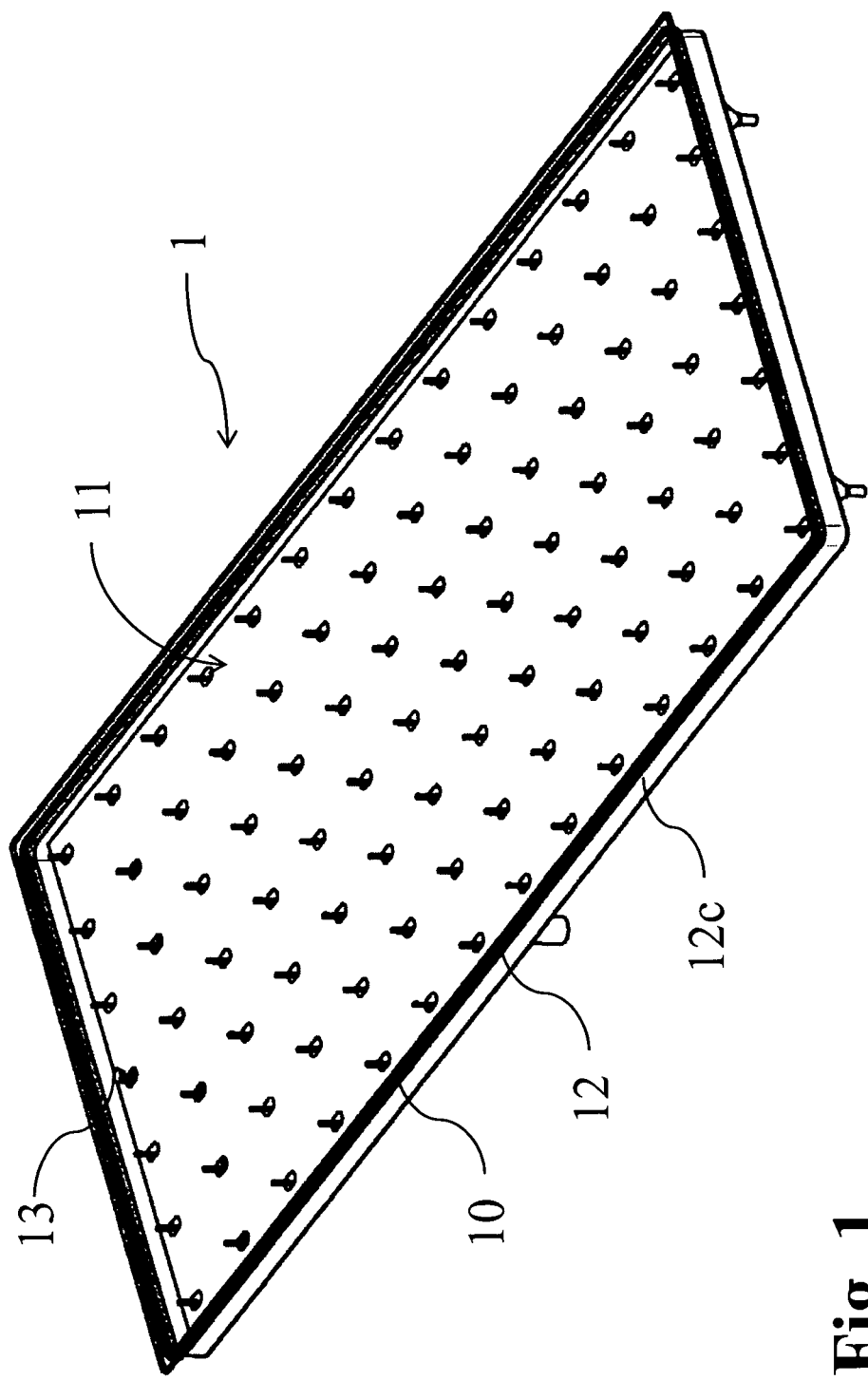
FIG. 1 schematically shows a vacuum solar thermal panel according to the present invention.
Figure 2:
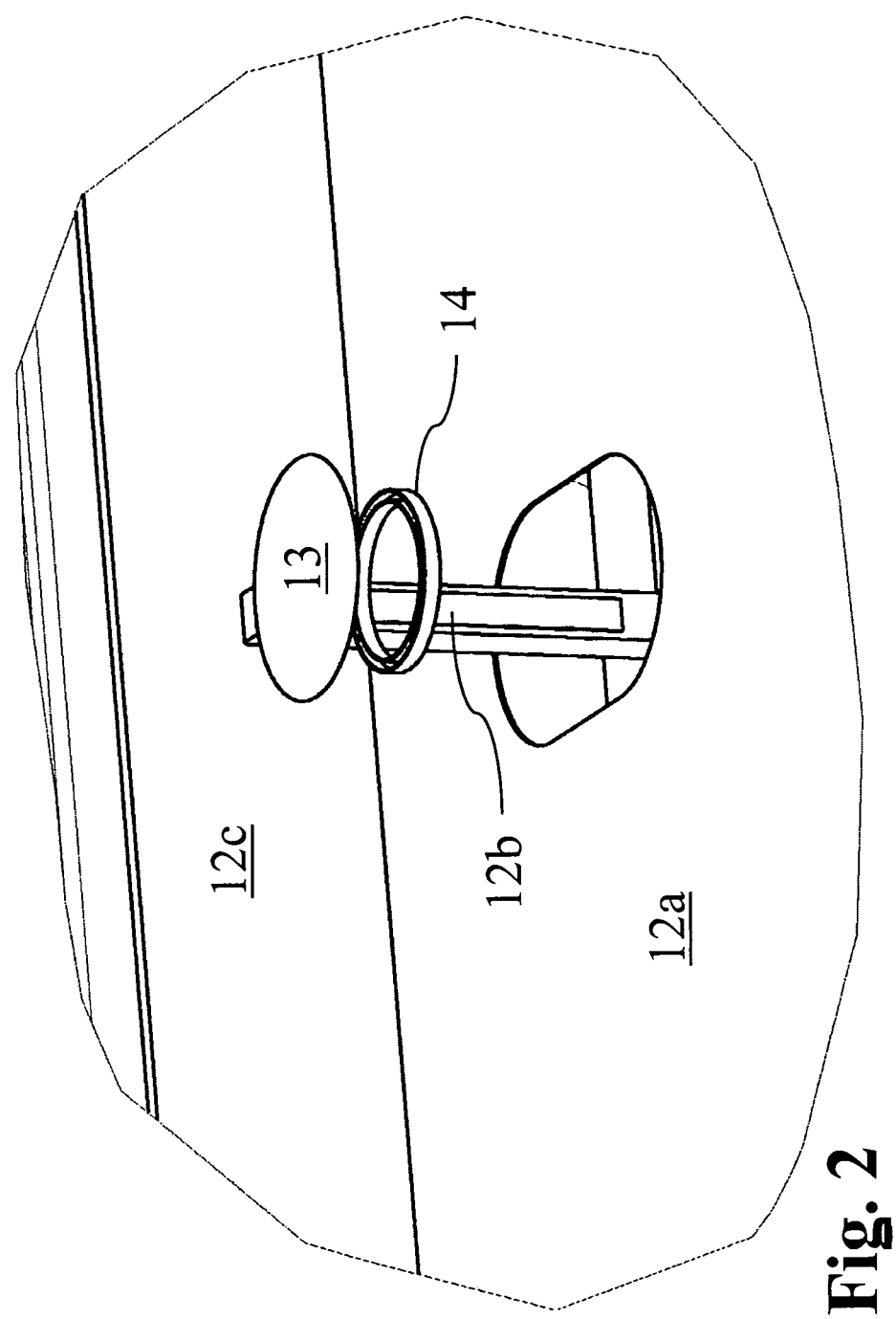
FIG. 2 schematically shows a detail of the vacuum solar thermal panel from FIG. 1.

With reference to the figures, and in particular to FIG. 1, the vacuum solar thermal panel according to the present invention is shown and globally indicated with 1.

The vacuum solar thermal panel 1 comprises a vacuum-tight envelope 10, which in turn is made up of a front plate 11, transparent to solar radiation, and a support structure 12 meant to support the front plate 11.

The support structure 12 comprises a substantially rectangular back plate 12a and side walls 12c rising from the perimeter of the back-plate 12a. The front plate 11, which is a substantially flat glass pane, closes the box-like structure formed by the back plate 12a and the side walls 12c. The support structure 12 further comprises a plurality of uprights 12b connecting the back plate 12a to the front plate. The main function of the uprights 12b is to support the glass pane withstanding atmospheric pressure.

Heat-absorbing means of the known type are enclosed within the vacuum-tight envelope; said absorbing means are thermally connected to a pipe crossing the vacuum-tight envelope 10. The heat-absorbing means and the pipe have been omitted in the figures for simplification purpose.

A non-evaporable getter is provided within the vacuum-tight envelope, preferably under the form of pills in good thermal contact with the heat-absorbing means. The non-evaporable getter means have been omitted in the figures for simplification purpose. The non-evaporable getter represents the main getter means acting within the vacuum-tight envelope 10.

The non-evaporable getter has been chosen as a preferred alternative to a flash getter since the latter would have reduced the transparency of the window pane making up the front plate 11, in turn reducing the efficiency of the vacuum solar thermal panel 1.

The vacuum solar thermal panel 1 comprises a pressure indicator spot 13 provided on the front plate 11.

The pressure indicator spot 13 is made up of a thin film of elemental barium, which has been deposited on the inner side of the front plate 11 by means of a flashing process described below. The pressure indicator spot 13 exhibit a roughly circular shape, and has an area comprised between 1 cm$^2$ and 3 cm$^2$. Given that the total transparent surface of the front plate is 1 m$^2$, the pressure indicator spot 13 only occupies less than 1% of such a surface.

The pressure indicator spot 13 has a silvery colour as long as high vacuum within the vacuum-tight envelope is maintained; as soon as the internal pressure rises above $10^{-2}$ Torr, the pressure indicator spot 13 reduces in size and or turns white providing a clear visual indication of the problem.

The pressure indicator spot 13 is deposited next to one of the uprights 12b of the support structure 12. A ring-shaped reservoir 14 is solidly attached to the upright 12b. The reservoir 14 is placed right below where the pressure indicator spot 13 will be deposited at a distance comprised between 1 mm and 3 mm from the inner side of the front plate 11, and opens toward the front plate 11.

Such a reservoir is used during a flashing step of the manufacturing of the vacuum solar thermal panel 1, as described below.

The reservoir 14 is filled with a suitable amount (1 mg to 3 mg) of elemental barium combined with other compounds to facilitate the flashing process described below of the known type. When the vacuum-tight envelope 10 has been evacuated and sealed, the temperature of the reservoir 14 is raised by means of induction heating until an exothermic reaction takes place. The elemental barium then evaporates, onto the inner side of the front plate 11, forming a thin film representing the pressure indicator spot 13.

Obviously, the afore-described finding may be subjected to numerous modifications and variants—by a man skilled in the art with the aim of meeting the possible and specific requirements—all falling within the scope of protection of the invention as defined by the following claims.

The invention claimed is:

1. A vacuum solar thermal panel, comprising:
   a vacuum-tight envelope, having at least a front plate transparent to solar radiation and a support structure for said front plate;

heat-absorbing means enclosed within said vacuum-tight envelope;

main getter means for keeping a vacuum condition within the vacuum envelope;

a pressure indicator spot of reactive material deposited on an inner side of said front plate, said reactive material undergoing a reaction noticeable from the outside of the vacuum-tight envelope when the pressure within said envelope exceeds a threshold.

2. The vacuum solar thermal panel according to claim 1, wherein the pressure indicator spot on the front plate has an area of at most 10 $cm^2$.

3. The vacuum solar thermal panel according to claim 2, wherein the area of the pressure indicator spot is between 1 $cm^2$ and 3 $cm^2$.

4. The vacuum solar thermal panel according to claim 1, wherein the area of the pressure indicator spot is at most 1% of the total transparent area of the front plate.

5. The vacuum solar thermal panel according to claim 1, wherein the amount of reactive material forming the pressure indicator spot is between 1 and 5 mg.

6. The vacuum solar thermal panel according to claim 1, wherein the reactive material forming the pressure indicator spot is elemental barium.

7. The vacuum solar thermal panel according to claim 1, wherein the main getter means comprise a non-evaporable getter.

8. The vacuum solar thermal panel according to claim 1, wherein a reservoir is solidly attached to the support structure next to the inner side of the front plate, said reservoir being predisposed to contain the reactive material before flashing.

9. The vacuum solar thermal panel according to claim 8, wherein said reservoir is placed at a distance between 1 and 3 mm from the inner side of the front plate.

10. The vacuum solar thermal panel according to claim 8, wherein said support structure comprises a back plate and a plurality of uprights connecting said back plate to said front plate, said reservoir being solidly attached to one of said uprights.

11. The vacuum solar thermal panel according to claim 10, wherein said reservoir is ring-shaped.

12. The vacuum solar thermal panel according to claim 1, wherein said front plate is substantially flat.

\* \* \* \* \*